O. STOPP & E. H. SCHULTZ.
VEHICLE TOP.
APPLICATION FILED DEC. 3, 1915.
1,203,430.
Patented Oct. 31, 1916.
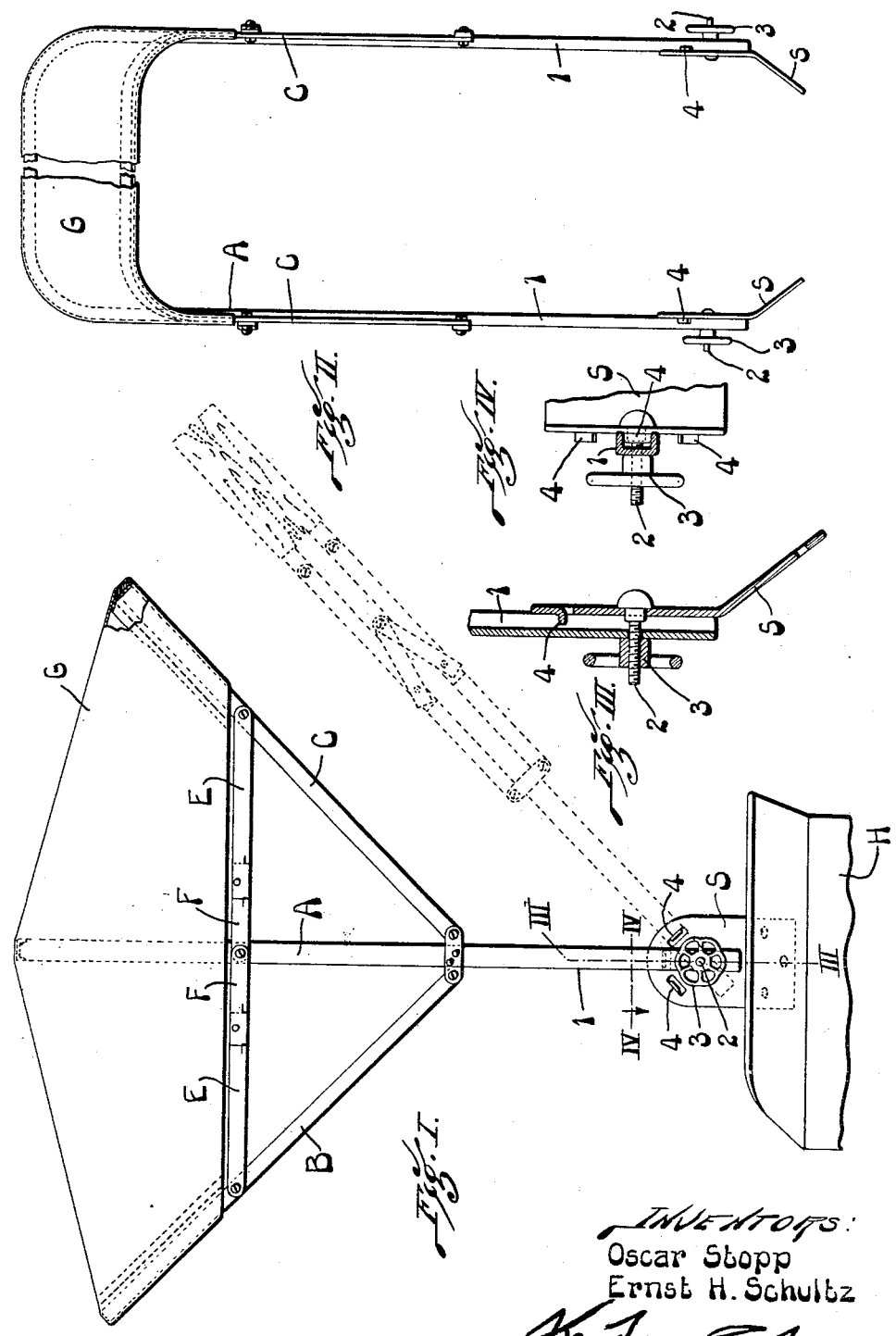
INVENTORS:
Oscar Stopp
Ernst H. Schultz
BY Knight + Cook ATTYS

UNITED STATES PATENT OFFICE.

OSCAR STOPP AND ERNST H. SCHULTZ, OF ST. LOUIS, MISSOURI, ASSIGNORS TO ZITTLOSEN MANUFACTURING COMPANY, OF ST. LOUIS, MISSOURI, A CORPORATION OF MISSOURI.

VEHICLE-TOP.

1,203,430.      Specification of Letters Patent.      Patented Oct. 31, 1916.

Application filed December 3, 1915. Serial No. 64,795.

*To all whom it may concern:*

Be it known that we, OSCAR STOPP and ERNST H. SCHULTZ, citizens of the United States of America, residents of the city of St. Louis, State of Missouri, have invented certain new and useful Improvements in Vehicle-Tops, of which the following is a full, clear, and exact description, reference being had to the accompanying drawings, forming a part of this specification.

Our invention relates to improvements in vehicle tops, one of the objects being to produce a strong, simple and inexpensive fastening device including pivot members for supporting a vehicle top, and means for securing the vehicle top to prevent it from turning about the axis of the pivot members.

With this object in view, the preferred form of the invention includes a vehicle top having a bow which is extended downwardly to form a pair of legs, a support to which the legs are pivoted, said support being provided with a series of projections adapted to enter said legs to prevent them from turning on their pivots, and a screw threaded member for retaining said legs in interlocking engagement with said projections.

Prior to this invention the frames of vehicle tops have been made of wood, and fabric covers have been secured to the wooden frames by tacks which are usually covered by leather trimmings. The wooden frames are necessarily quite heavy and the tacks and trimmings involve considerable labor and expense; therefore, one of the objects of the invention is to produce a frame of this kind having its elements made of metal, the middle bow, or main bow, being preferably a channel bar and the other bows being made of plain flat bars. As compared with wood, the metal channel bar is far stronger, more rigid, lighter, more durable and less expensive. The flat metal bars possess similar advantages, and to avoid the expense and labor of tacking the cover onto the bows and then fastening trimmings over the tacks, the flat bars are preferably inserted through pockets at margins of the cover, thus eliminating certain expensive and undesirable elements, at the same time producing a more sightly, stronger and cheaper structure.

Figure I is a side elevation of a vehicle top embodying the features of our invention. Fig. II is a rear elevation of the vehicle top and its fastening device, the middle portion of the top being broken away. Fig. III is an enlarged vertical section taken approximately on line III—III, Fig. I, the vehicle seat being omitted. Fig. IV is an enlarged horizontal section on line IV—IV, Fig. I.

To illustrate the invention we have shown a vehicle top having a middle bow A which extends downwardly to form a pair of yieldable legs 1; a front bow B pivoted to said middle bow, a rear bow C pivoted to said middle bow, toggle links E and F connecting said middle bow to the front and rear bows, and a cover G secured to the different bows.

H designates a vehicle seat having the ordinary flaring, or inclined, sides, and S designates supporting members secured to said sides. The lower portion of each supporting member S is preferably bent to conform to the inclination of the sides of the seat H.

2 designates pivot screws extending from the supporting members S and passing through the legs 1. These pivot screws constitute a pivotal support for the top. Nuts 3, in the form of wheels are fitted to the pivot screws and movable thereon to force the legs 1 into engagement with the supporting members S. The lower portion of each leg 1 is preferably channel shaped in cross section (Fig. IV), and the upper portion of each supporting member S is preferably provided with a series of projections adapted to enter the channel shaped portion of one of the legs 1 to prevent the top from turning on the pivot screws 2. In adjusting the top from one position to another, the nuts 3 are loosened and the yieldable legs 1 are forced away from each other to release their channel shaped portions from projections 4, thus permitting the top to turn on the pivot screws 2. After the top has been adjusted to the desired position the yieldable legs 1 are interlocked with projections 4, and the nuts 3 are then tightened to positively retain said parts in interlocking engagement with each other.

Obviously the top may be easily and quickly adjusted from one position to another to serve as a most efficient sunshade, or rain shield; and after it has been adjusted the parts are very firmly secured by the projections 4 which interlock with the channel shaped legs 1 and also by the nuts 3 which force the legs into frictional engagement with the supporting members S, at the same time holding said legs in such a manner that they cannot be accidentally released from the projections 4.

When the top is not in service it may be closed and shifted to the position shown by dotted lines in Fig. I; or if desired it may be released from the projections 4 and dropped to a point below the upper edge of the seat.

The long middle bow, or main bow, is preferably a single piece of channel iron extending from one of the supporting members S to the other, and the legs of the channel are preferably turned inwardly so that the plain face of the channel web will engage the cover G. The short bows B and C are preferably made of plain flat iron bars.

Pockets are formed at the front and rear margins of the cover by folding the fabric backwardly and stitching it as shown in Fig. I. The iron bows B and C are inserted through these pockets to secure the cover to the metal frame. The metal channel bar and the metal bows associated therewith produce a frame that is far stronger, much lighter and cheaper than wood, and the cover may be easily applied to the metal frame without the use of expensive and unsightly fastening devices.

We claim:

In a device of the character described, supporting members adapted to be secured to the seat of a vehicle, portions of each supporting member being bent outwardly to form a series of projections on its outer face, a vehicle top having a bow, the ends of which are extended downwardly to produce a pair of legs, pivot screws extending from said supporting members and passing through the lower portions of said legs to form a pivotal support for said top, the lower portions of said legs being channel shaped in cross section and the flanges of said channel shaped portions being turned inwardly to form recesses for the reception of the different projections on said supporting members, said legs being movable from one of said projections to another so as to locate the top in different positions, and threaded members fitted to said pivot screws so as to retain the channel shaped lower portions of said legs in interlocking engagement with said projections.

OSCAR STOPP.
E. H. SCHULTZ.

Copies of this patent may be obtained for five cents each, by addressing the "Commissioner of Patents, Washington, D. C."